Nov. 24, 1959  B. R. GRANBERG ET AL  2,913,945
LATHES
Filed Aug. 11, 1954  10 Sheets-Sheet 1

INVENTORS.
Bengt R. Granberg
Carl H. Johnson
By: Axel Anderson
Schroeder, Hofgren, Brady & Wegner
Attys.

Nov. 24, 1959   B. R. GRANBERG ET AL   2,913,945
LATHES

Filed Aug. 11, 1954   10 Sheets-Sheet 3

Nov. 24, 1959     B. R. GRANBERG ET AL     2,913,945
LATHES

Filed Aug. 11, 1954     10 Sheets-Sheet 7

INVENTORS.
Bengt R. Granberg
Carl H. Johnson
Axel Anderson
By:
Attys.

Nov. 24, 1959  B. R. GRANBERG ET AL  2,913,945
LATHES
Filed Aug. 11, 1954  10 Sheets-Sheet 8

INVENTORS
Bengt R. Granberg
Carl H. Johnson
Axel Anderson

INVENTORS.
Bengt R. Granberg
Carl H. Johnson
Axel Anderson
By Schraeder, Hofgren,
Brady & Wegner
Attys United States Patent Office 2,913,945
Patented Nov. 24, 1959

2,913,945

LATHES

Bengt R. Granberg, Carl H. Johnson, and Axel Anderson, Rockford, Ill., assignors to Sundstrand Corporation, a corporation of Illinois Application August 11, 1954, Serial No. 449,173

8 Claims. (Cl. 82—14)

The invention relates generally to machine tools and, more particularly, to a tracer controlled lathe and the provision therein of novel mechanism for controlling the cutting movement of the tools to remove one or more layers of material from a workpiece with a single setting of the machine. It is a general object of the invention to provide a new and improved manufacturing lathe of the type described materially speeding up production and adapted for quick and easy set-up and change-over to render the lathe practical and economical for short runs.

Another object is to provide a lathe of the type described having a longitudinally reciprocable carriage, a tool slide movable transversely on the carriage, and novel means for automatically adjusting the position of the tool slide on the carriage between successive cutting strokes to remove two or more layers of material from a workpiece.

A further object is to provide a lathe of the type described having a longitudinally reciprocable carriage, a tool slide movable transversely on the carriage, a piston and cylinder connected to move the slide on the carriage, a tracer control valve on the slide having a stylus adapted to contact a control template on the lathe as the carriage is moved to control the piston and cylinder and thereby guide the tool in a path conforming to the pattern of the template, and novel means mounting the valve on the slide for automatic adjustment of the stylus with respect to the tool between successive cutting strokes.

It is another object to provide in a lathe of the type described having a rotary work supporting spindle a carriage reciprocable longitudinally of the spindle axis and a tool slide mounted on the carriage for movement transversely of the spindle axis, a piston and cylinder connected to move the slide on the carriage, means for controlling the piston and cylinder including a valve unit on the slide having a stylus adapted to engage a control template on the lathe bed as the carriage moves through a feed stroke to control the valve and thereby guide the tool in a path conforming to the pattern of the template, and a novel arrangement for effecting removal of two or more layers of material from the workpiece on successive feed strokes of the carriage, including means movably mounting the valve unit on the tool slide for adjustment longitudinally and transversely of the spindle axis between feed strokes to similarly vary the position of the stylus with respect to the tool and thereby vary the position of the tool with respect to the workpiece.

A further object is to provide in a lathe of the type described, means for automatically controlling the carriage and tool slide to move, on initiation by an operator, through a cycle to effect two or more cuts on a workpiece and stop.

Another object is to provide, in a lathe of the type described, additional means for automatically controlling the valve to provide a rapid withdrawal of the tool slide at the end of the feed stroke.

It is also an object of the invention to provide a novel control attachment for use in a lathe of the type described having a bed and a longitudinally reciprocable carriage, the attachment including a base plate adapted to be mounted on the carriage, a tool slide movable transversely on the base plate and a novel mechanism carried by the slide and adapted to cooperate with the bed as the carriage reciprocates to adjust the position of the tool slide on the base plate to effect the removal of two or more layers of material from a workpiece on successive strokes of the carriage.

It is another object of the invention to provide a novel tracer control attachment for use with a lathe having a bed, a carriage longitudinally reciprocable on the bed, and a tracer control template stationarily mounted on the bed, the attachment including a base plate adapted to be mounted on the carriage, a tool slide movable transversely on the base plate, a piston and cylinder connected to move the slide on the base plate, a tracer valve unit for controlling the piston and cylinder including a stylus adapted to contact the template as the carriage is moved and to thereby guide the tool in a path conforming to the pattern of the template, the valve unit being movably mounted for adjustment on the slide longitudinally and transversely of the spindle axis to similarly vary the position of the stylus with respect to the tool between successive cutting strokes to remove two or more layers of material from a workpiece, and mechanism for adjusting the valve unit on the slide including an actuating lever extending from the slide in a position to strike a stop on the bed of the lathe at the end of a return stroke of the carriage.

Another object is to provide in an attachment of the type described a means for controlling the valve in the valve unit to provide a rapid withdrawal of the tool slide at the end of a cutting stroke.

Other objects will become apparent from the following detailed description taken in connection with the accompanying drawings, in which:

Fig. 2 is a diagrammatic perspective showing of the drive for the spindle and for the carriage and cross slides therefor;

Fig. 2a is a front elevation showing the dog disc and switches controlled thereby;

Fig. 2b is a sectional view taken on the line 2b—2b of Fig. 2a;

As shown in the drawings, the invention is embodied in a lathe which includes a bed 2 having guide 4 extending longitudinally of the bed cooperating with guideway 6 of a carriage 12 to support and guide the carriage for reciprocal movement through feed, or cutting, and return strokes on the bed.

Figure 1:
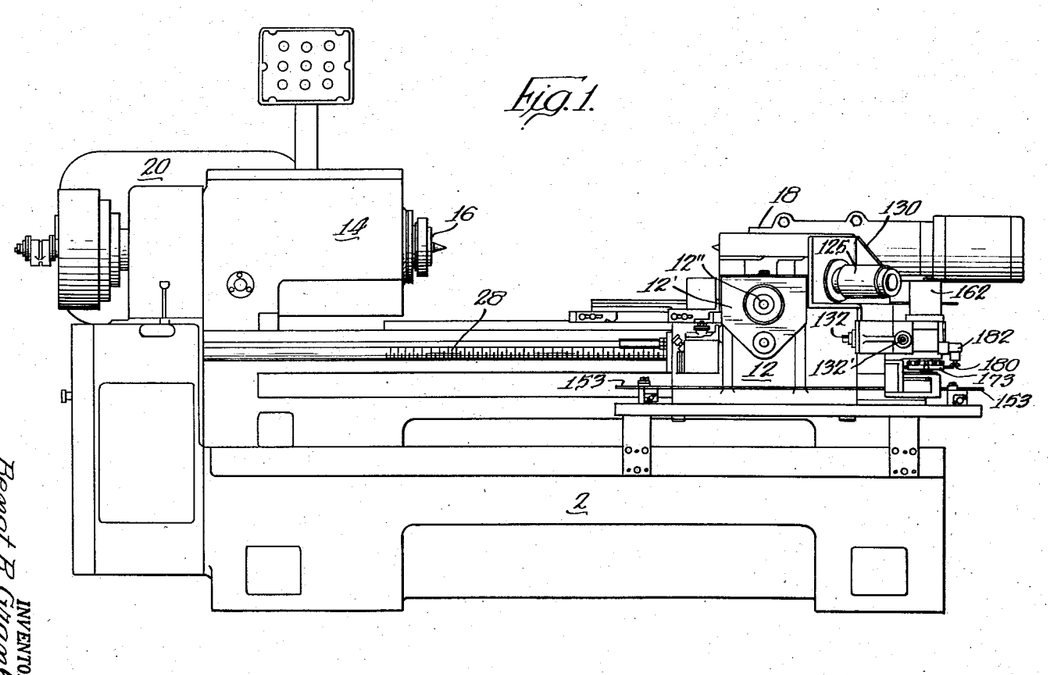
Fig. 1 is a front elevation of a lathe embodying a preferred form of the invention.
Figures 2, 2A, 2B:
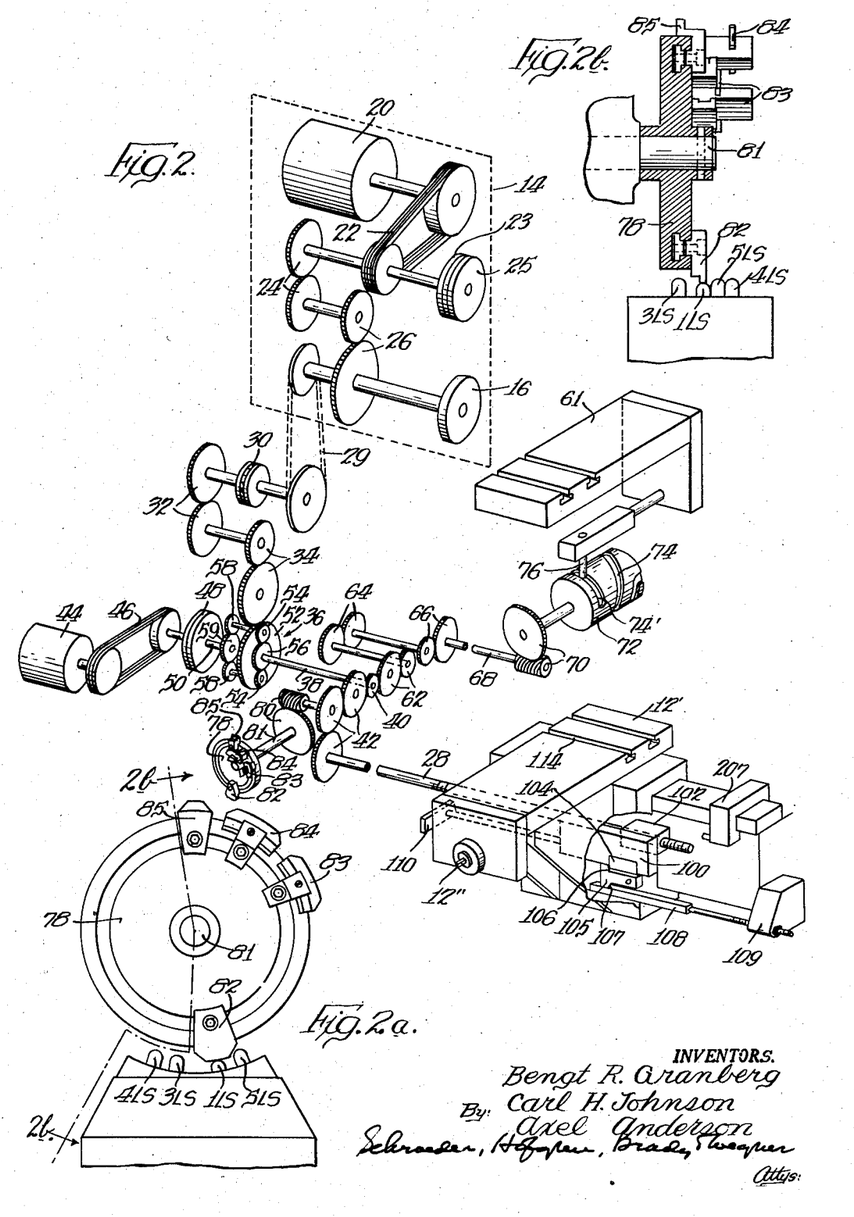

The bed supports a tail stock 18, and a head stock 14 in which is mounted a rotary work supporting spindle 16. Referring to Fig. 2, it will be seen that the work supporting spindle is arranged to be driven from a spindle motor 20 through a multiple belt drive 22, a clutch and brake having a clutch coil 23 and a brake coil 25, respectively, replaceable speed change gears 24 and gearing 26.

The carriage 12 is driven through its feed and return strokes on the bed, longitudinally of the spindle axis, by a feed screw 28 which is arranged to be driven from two sources to provide a forward feed or cutting movement and a rapid return or traverse movement. This mechanism is of the general type disclosed in U.S. Letters Patent 2,144,735 of January 24, 1939 to Granberg et al. and comprises firstly, the feed screw 28, driven from the rotary work supporting spindle through chain 29, a manually controllable feed clutch 30, replaceable feed change gears 32, gearing 34, differential or planetary gearing 36, shaft 38 and gearing 40, 42. Secondly, the feed screw is driven from a high speed rapid return motor 44 through multiple belt drive 46, brake 48, shaft 50, differential or planetary gearing 36 and the gearing previously described. The brake 48 is electrically controlled to be released on energization of the motor 44 and applied on deenergization of the motor.

The differential 36 includes a planetary gear carrier 52 having planetary pinions 54 on one side thereof in mesh with a sun gear 56 on the shaft 38. The planetary carrier 52 also carries pinions 58 on the opposite side thereof in mesh with a sun gear 59 on the shaft 50.

With the spindle motor 20 energized, with the spindle clutch 23 energized and the spindle brake 25 deenergized, with the reversible motor 44 deenergized and with the brake 48 applied, the feed screw 28 will be driven at its slow forward feed or cutting speed. While the spindle motor 20 is driving the feed screw 28, the high speed rapid return motor 44 may be energized and through the differential gearing 36 the feed screw will be driven in the opposite direction to provide a rapid return of the carriage.

The spindle motor 20 and the high speed rapid return motor 44 are automatically controlled to move the carriage through a cycle of operation to include up to four cuts on a workpiece. The motors are controlled by limit switches 1LS, 3LS, 4LS and 5LS which are actuated by switch actuating dogs on a control dog disc 78 driven from the gearing 42 in the carriage drive through worm and worm gear 80 and shaft 81 in proportion to the carriage movement. The dog disc 78 includes circumferentially adjustable dogs 82, 83, 84 and 86. The dog 82 engages limit switch 1LS at the limit of return movement of the carriage; dog 83 engages limit switch 5LS to determine the length of the first cutting stroke in a cycle; dog 84 engages limit switch 4LS to determine the length of the second cutting stroke; and dog 86 engages limit switch 3LS to determine the length of the third cutting stroke. The dogs are adjusted on the disc to actuate the switches to provide succeeding cuts of progressively greater length as described more in detail hereinafter in connection with the wiring diagram.

The lathe may also be provided with a rear tool slide 61 mounted on the bed for transverse movement thereof in timed relation to the movement of the front carriage. This slide is arranged to be reciprocably driven, from the gear 40 in the feed screw drive, through gearing 62, replaceable feed change gears 64, gears 66, shaft 68, worm and worm gear 70 and a drum type cam having a cam groove 74 in which is received a pin 76 carried by the rear slide. The cam groove 74 is provided with a dwell portion 74' which permits a delay in actuation of the rear slide until after a predetermined movement of the front carriage. This structure is generally old, as shown in the aforementioned Granberg, et al. Patent No. 2,144,735.

The carriage 12 may be driven from the feed screw 28 through a lost motion connection which will permit a termination of the carriage feed stroke before the forward rotation of the feed screw is completed. This termination of the carriage feed stroke is timed to occur as the dwell portion 74' of the groove 74 passes the pin 76 on the rear slide, so that the rear tool slide is actuated to move forward to effect a facing operation on the workpiece after the movement of the front carriage has taken place.

The lost motion connection is of the type disclosed in U.S. Letters Patent No. 2,206,886 of July 9, 1940 to Granberg, et al. and includes a feed bar 100 mounted on the bed for reciprocal movement longitudinally thereof and having integral therewith a carriage nut 102 which threadably receives the feed screw 28. The feed bar is provided with a downwardly extending shoulder 104 and the carriage is provided with a pivoted dog 105 having an upwardly extending lug 106 which is engaged by the shoulder 104 to move the carriage in a forward direction. The carriage slidably supports a longitudinally-extending cam 108 adjustably secured at 109 to the bed and the dog 105 is provided with a downwardly-extending lug 107 which is adapted to ride on the cam 108. After a predetermined forward motion of the carriage, the lug 107 will ride off the cam 108 and allow the pivoted dog 105 to drop down, thus disconnecting the carriage from the feed bar and allowing a continued forward motion of the feed bar after the carriage has stopped. When the feed bar is moved in a return direction, a forwardly-extending lug 110 thereon will catch on the carriage to provide its return movement.

The present invention is concerned with an improvement to provide an automatic multiple-cut cycling of the cutting tool to remove two or more layers of material from a workpiece. The carriage 12 supports a cross slide 12' for adjustment transversely thereon by a square-ended screw 12'' in the usual manner. T slots 114 are usually provided on the cross slide to facilitate the attachment of a tool holder. The invention includes an attachment adapted to be mounted on the cross slide.

Figures 6, 7:
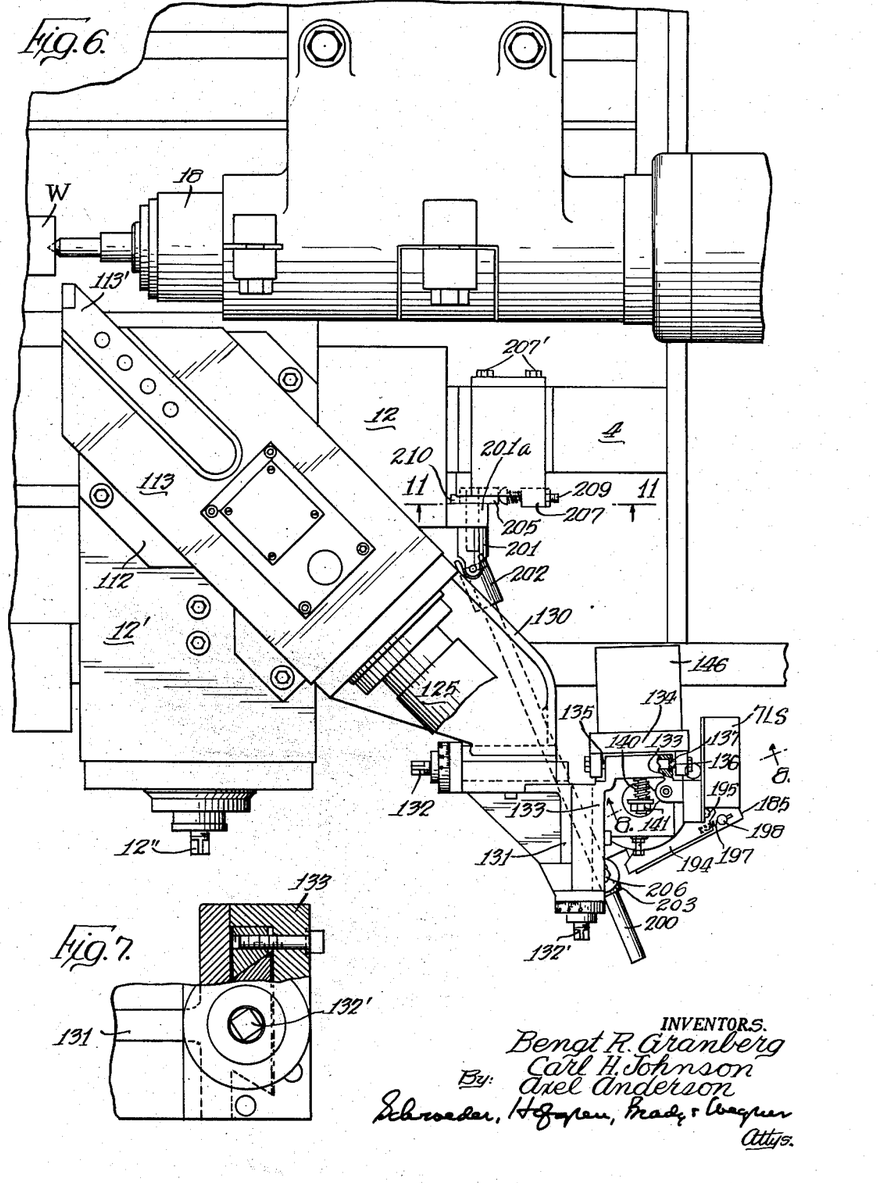
Fig. 6 is an enlarged plan view showing the front tool slide and tracer attachment thereon.
Fig. 7 is a fragmentary front view, partly in section, of the transverse micrometer adjustment.

The attachment includes a base plate 112 adapted to be mounted on the cross slide 12' by bolts and having a tool slide 113 mounted thereon for reciprocal movement transversely of the axis of the work supporting spindle. Referring to Fig. 6, it will be seen that the movement of the tool slide on the base plate is at an angle of about 45° to the spindle axis. Thus, a withdrawal of the tool at this angle at a time when the carriage is moving longitudinally of the workpiece will permit a substantially right angled movement of the tool with respect to the work axis to provide a right angled cut on the workpiece. The tool slide 113 carries a cutting tool 113' adapted to engage the workpiece on movement of the slide toward the spindle axis, and to perform a turning operation on the rotating work on longitudinal movement of the carriage.

Figures 3, 4:
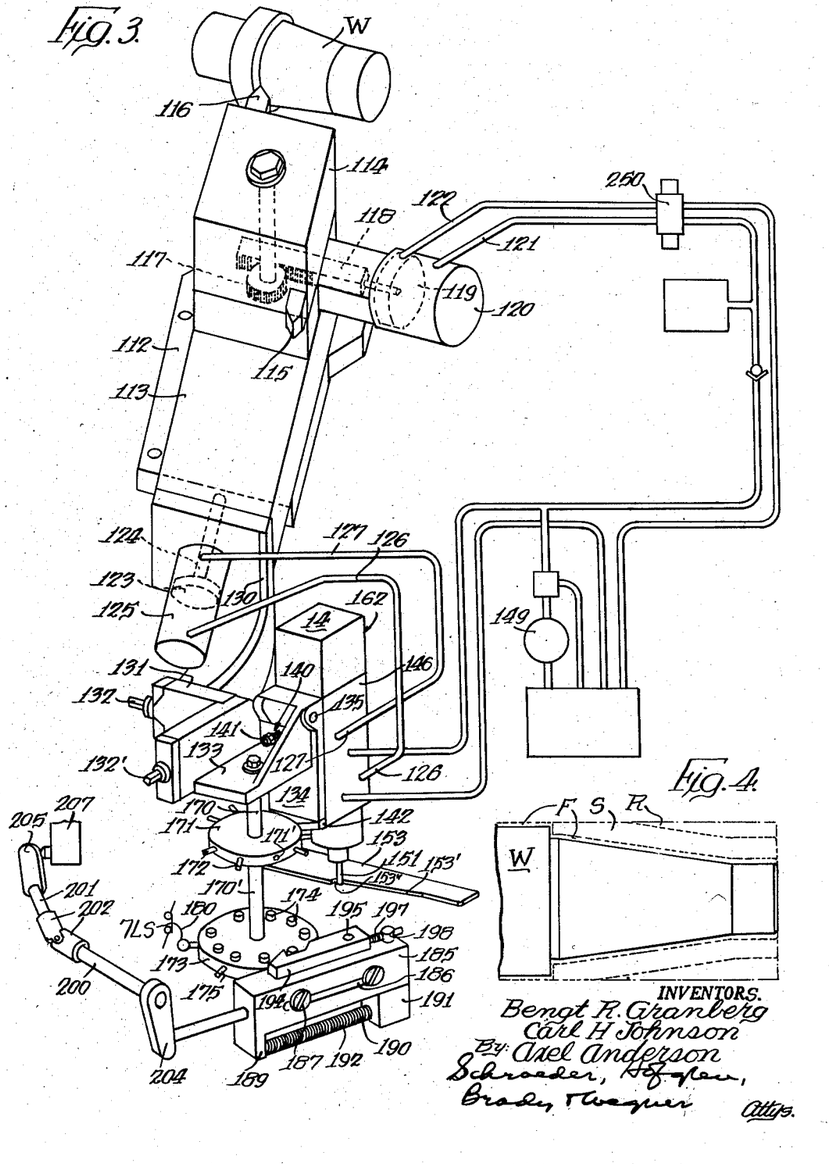
Fig. 3 is a diagrammatic showing of the tracer attachment to be mounted on a conventional lathe.
Fig. 4 is a diagrammatic view of a typical workpiece showing the layers of material removed.

As shown in the diagrammatic illustration of Fig. 3, a tool turret 114 is rotatably mounted uprightly on the slide for movement about a vertical axis through at least 180° and return. This turret carries a roughing tool 115 and a finishing tool 116 mounted at substantially diametrically opposite positions. The turret is provided with a pinion 117 secured thereto which engages a rack 118 reciprocably mounted on the slide for actuation by a piston and cylinder 119, 120. Opposite ends of the cylinder 120 are connected with a source of fluid under pressure by fluid conduits 121 and 122 which are controlled by a valve 250. It is apparent that admission of fluid to opposite ends of the cylinder 120 will result in a reciprocal movement of the rack 118 to index either the roughing tool 115 or the finishing tool 116 to a work position. The valve 250 may be manually or automatically controlled to present either the roughing tool or the finishing tool to a work position as desired while the slide is in a withdrawn position.

The tool slide is moved on the base plate by means of a piston and cylinder device including a piston 123 connected by a rod 124 to the base plate and a cylinder 125 connected to the tool slide. Fluid under pressure is supplied to opposite ends of the cylinder by fluid conduits 126 and 127 under control of a valve unit 146 carried by the slide. Fluid under pressure is provided at the valve unit by a hydraulic pump driven by electric motor 149.

The valve unit 146 is of the type shown in Turchan, et al. Patent No. 2,301,719 of November 10, 1942 and includes a slide valve which is biased downwardly as viewed in Fig. 5 and Fig. 16, by a spring 146' to admit fluid to the cylinder 125 through conduit 127 to move the tool slide toward a workpiece supported by the spindle. A tracer valve stylus 151, universally mounted in the valve unit, extends downwardly to cooperate with a tracer control template 153 stationarily mounted on the bed of the lathe to move the valve in an upward direction in response to any movement of the stylus on contact with the template. Thus, as the slide moves toward a workpiece, the stylus will engage the template to reverse the valve and move the slide out, but as soon as this happens, the spring 146' moves the valve to its original position. In this manner, the transverse position of the slide is sensitively controlled and as the carriage is moved longitudinally of the bed through a feed stroke, the cutting tool will follow a path determined by the pattern of the template 153 in a well-known manner.

Figures 5, 6A:
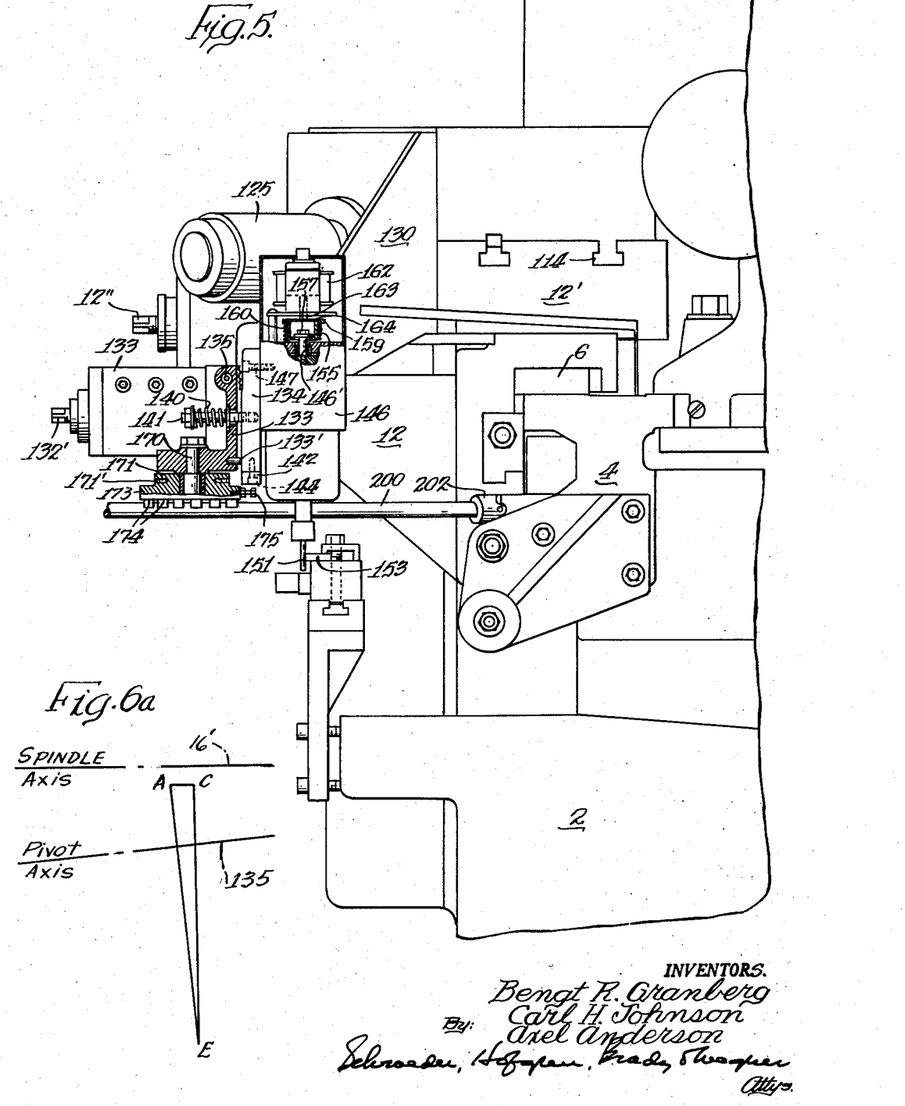
Fig. 5 is an enlarged fragmentary end view, partly in section, into the right-hand end of the lathe, as shown in Fig. 1.
Fig. 6a is a diagrammatic plan view illustrating the movement of the tracer stylus relative to the spindle axis on adjustment of the tracer unit.

In order to provide for a rapid withdrawal of the tool slide from a work position at the end of a feed stroke, the valve unit described above is provided with a cup-shaped member 155 which, as shown in Fig. 5, is arranged to be seated below a nut 157 of the valve stem which extends from the valve unit. A spring 160 bears between the top of the valve unit and a lip 159 on the cup-shaped member 155. This spring is stronger than the spring 146' in the valve unit and thus will normally maintain the valve in a raised position in which fluid is admitted to the cylinder 125 through conduit 126 to move the slide rapidly to and to thereafter hold it in, a withdrawn position with piston 123 at end of cylinder 125. A push type solenoid 162 is mounted on the valve unit above the cup-shaped member 155 and is provided with a rod 163 which engages a closure member 164 on the cup-shaped member 155 so that on energization of the solenoid 162, the spring 160 is overcome and the spring in the valve unit will take over.

As is explained more fully hereinafter, this solenoid is arranged to be energized at the end of a return stroke so that the cross slide may move in toward a work position and to be deenergized at the end of a feed stroke so that the spring 160 effects a rapid actuation of the valve to provide a quick withdrawal of the tool slide.

Figures 15, 16, 17:
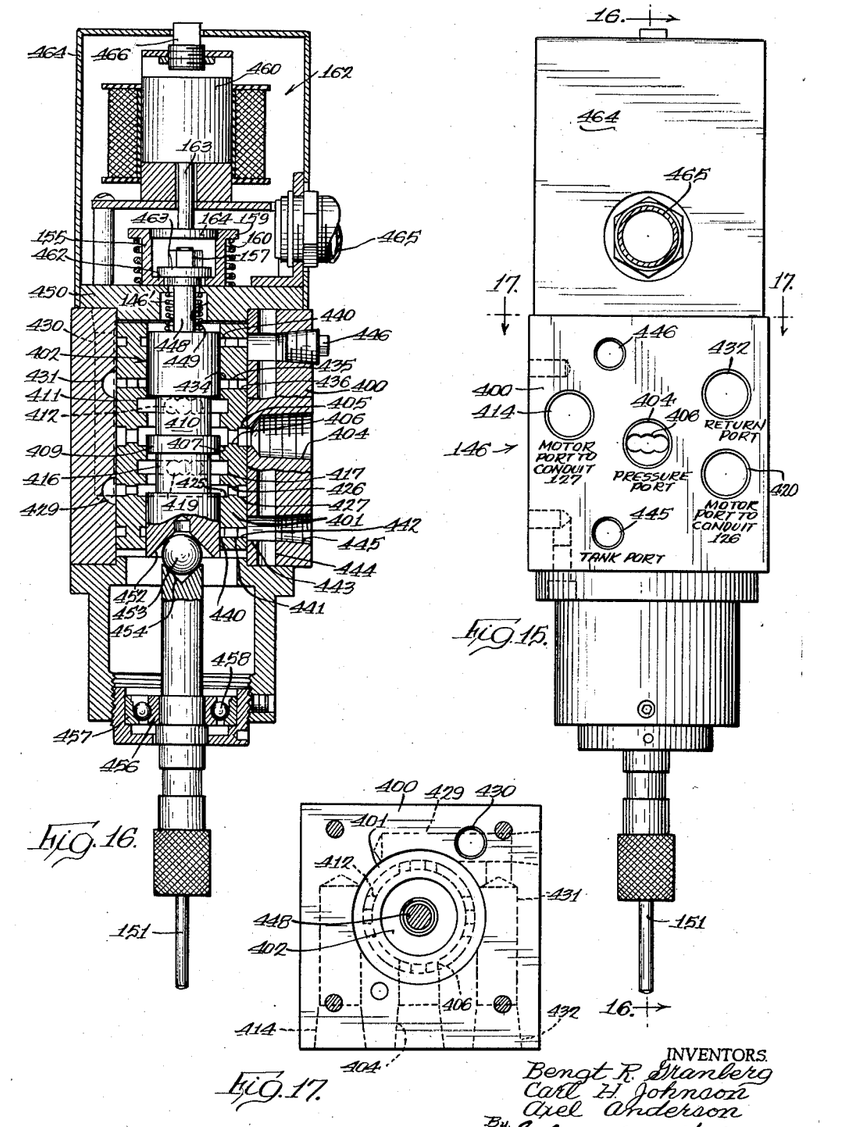
Fig. 15 is an enlarged elevational view of a typical tracer control valve unit, taken from the right as viewed in Fig. 3.
Fig. 16 is a longitudinal sectional view of the valve unit, taken at about the line 16—16 of Fig. 15.
Fig. 17 is a sectional view taken at about the line 17—17 of Fig. 15.

Figs. 15, 16 and 17 illustrate details of a typical tracer control valve suitable for use in the lathe of this application as including a valve housing 400 having a central bore therethrough in which a sleeve 401 is permanently fitted. The sleeve has a central valve bore in which a valve member 402 is slidable. Housing 400 has a centrally located pressure port 404 adapted for connection by suitable conduit means with a source of pressure fluid such as that illustrated at 149 in Fig. 3. The pressure port 404 opens into an outer sleeve groove 405 connected by ports 406 to an inner sleeve groove 407. The inner groove 407 may be blocked by a central land 409 on the valve member 402 when the latter is moved upwardly from the position illustrated in Fig. 16. The valve member 402 may be moved downwardly from the central position just described to the position illustrated in Fig. 16 wherein the inner sleeve groove 407 is connected by a stem groove 410 to an inner sleeve groove 411 which in turn is connected by ports through the sleeve as at 412 with a motor port 414 in the housing 400. The motor port 414 is adapted for connection with a conduit such as that illustrated at 127 in Fig. 3 to admit fluid to the inner end of the cylinder 125, thereby to move the cross slide inwardly toward the axis of the work. Alternatively, the valve member 402 may be moved upwardly from the central position to connect the inner pressure groove 407 to a stem groove 416 and an inner sleeve groove 417 in turn connected by ports 419 (through the sleeve 401) to a motor port 420 in the housing 400 adapted for connection with a conduit such as that at 126 in Fig. 3 for supplying fluid under pressure to the outer end of cylinder 125 thereby to move the cross slide outwardly away from the axis of the work.

When the valve stem 402 is moved downwardly to the position illustrated in Fig. 16, connecting the pressure port 404 to the motor port 414, the motor port 420 is connected to drain through ports 419, inner sleeve groove 417, stem groove 416, inner sleeve groove 425, ports 426, outer sleeve groove 427, a horizontal bore 429 in the housing 400, an intersecting vertical bore 430, and a horizontal bore 431 leading to a return port 432 in the housing 400 adapted for connection with a return conduit leading to the pump intake or to a reservoir or tank. When the valve stem 402 is moved upwardly to connect the motor port 420 with the pressure port 404, the motor port 414 is connected to drain through ports 412 in the sleeve 401, inner sleeve groove 411, stem groove 410, an inner sleeve groove 434, ports 435 in the sleeve 401, an outer sleeve groove 436, the horizontal bore 431 in housing 400, and the return port 432.

Leakage fluid flowing past the upper and lower valve lands on stem 402 passes through upper and lower inner sleeve grooves 440, sleeve ports 441, outer sleeve grooves 442, ports 443 in housing 400, a longitudinal bore 444 in housing 400 and a tank port 445. One of two similar tank ports 445 may be plugged as at 446 in the case of the upper port.

Valve stem 402 has a rod 448 connected to its upper end and surrounded by the spring 146' seated in a cavity 449 in a cover 450 for the valve housing 400. The spring 146' urges valve stem 402 downwardly so that a conical cavity 452 in the lower end thereof seats upon a ball 453 in turn seated in a conical cavity 454 in the upper end of stylus 151. A portion of the stylus is mounted by means of a bearing including an inner race 456, an outer race 457, and ball bearing members 458 therebetween. Lateral pressure on the lower end of the stylus 151 as on engagement with a template pivots the stylus about the ball bearings 458 as permitted by the mounting of these bearings in the outer race 457, thereby to move the upper end of the stylus laterally and shift the valve stem 402 upwardly through the medium of the ball 453, against the urge of spring 146'.

Normally, the valve stem 402 is positioned as illustrated in Fig. 16 thereby to cause movement of the cross slide toward the work. Upon engagement of the stylus 157 with the template 153, valve stem 402 is shifted upwardly to block the pressure groove 407 or to open this groove to the lower motor port 420, thereby to stop the inward slide movement or cause a reverse, outward movement. As the template fades away and the stylus returns to its central position, the valve member 402 moves downwardly to cause movement of the cross slide inwardly. This tracer controlled slide movement is well known in the art.

It will be understood from the description hereinabove that the tracer unit 146 as described thus far normally effects a biasing of the cross slide toward the work. In order to retract the cross slide at the end of a cutting stroke to obtain relief during the return stroke of the carriage, the control of solenoid 162 is imposed on the control spring 146'. When the solenoid 162 is energized as illustrated in Fig. 16, the core 460 is moved downwardly to the position illustrated herein, push rod 163 engages the cover 164 on the cup 159 to move the cup downwardly against the bias of spring 160 thereby enabling the weaker spring 146' to control the valve as described. When the solenoid 162 is deenergized, the stronger spring 160 urges the cup 155 upwardly so that a flange 462 thereon engages a collar 463 on valve rod 448 to lift the valve stem 402 upwardly to a position reversing the cross slide to a withdrawn, tool relief position. The solenoid is enclosed by a cover member 464 having a conduit 465 leading thereto for housing a lead to the solenoid winding. A push button 466 mounted in the top of the housing 464 enables manual operation of the valve when the solenoid is deenergized, to cause movement of the cross slide toward the work.

Since the position of the tool is controlled by the stylus 151, it will be understood that any adjustment of the valve unit and stylus on the slide, with respect to the tool, will effect an adjustment of the tool with respect to the spindle axis and the workpiece. It is a feature of the invention that the valve unit is mounted on the slide in a manner to permit such an adjustment between cutting strokes in order to remove two or more layers of material from a workpiece on successive strokes of the carriage. For this purpose, the valve unit 146 is bolted as at 147 to a bracket 134 pivoted at 135 to a bracket 133. The bracket 133 is mounted for transverse adjustment on a bracket 131 which is mounted for longitudinal adjustment on an arm 130 extending forwardly from the tool slide. The brackets 131 and 133 are slidably mounted by dovetailed connections and are adjusted by means of screws 132 and 132' having squared heads adapted to receive a handle. Referring to Fig. 6, the pivotal mounting 135 for the bracket 134 includes conical trunnions 136 carried by the bracket 134 and received in bearings 137 on the bracket 133. The bracket 134 is biased toward the bracket 133 by means of a spring 140 bearing against the bracket 133 and against a nut on a bolt 141 mounted in bracket 134 and extending through an opening in the bracket 133.

The pivot axis 135 for the bracket 134 is slightly inclined to the spindle axis, as shown in Figs. 6 and 6a wherein AB is the direction of adjustment having components AC and BC. Thus, any movement of the tracer unit and stylus about the pivot axis includes a component normal to the spindle axis and a component parallel to the spindle axis and a corresponding adjustment of the stylus with respect to the tool. If, therefore, while the slide is in a withdrawn position after one cutting stroke, the tracer unit is allowed to pivot in a clockwise direction, as viewed in Fig. 3 or Fig. 5, the stylus will move transversely away from the surface 153' on the template and at the same time longitudinally to the right (Fig. 3 or Fig. 6) away from the shoulder 153" on the template. When the slide is next moved toward the workpiece into cutting position the tool will be permitted to move nearer the spindle axis than was permitted on the preceding cut, and when the carriage is moved through a cutting stroke the tool will be permitted to move more to the left relative to the shoulder 153" than was permitted on the preceding cut. This arrangement permits not only successive cuts on the diameter of a workpiece, but at the same time, permits successive facing cuts on a shouldered or flanged workpiece.

The components of movement for the tracer stylus relative to the spindle axis 16' on pivotal adjustment of the tracer bracket 134 about the pivot axis 135 are illustrated graphically in Fig. 6a. As seen there, the pivot axis 135 is inclined relative to the spindle axis 16'. Let it be assumed that the bracket 134 is initially positioned so that that portion of the stylus which engages the template is positioned at A. Now, if the bracket 134 is pivoted about the axis 135 away from the spindle axis 16' to a position wherein that portion of the stylus which engages the template is positioned at B, the stylus will have two components of movement relative to the spindle axis 16'. One component, CB, is normal to the spindle axis and away from the surface 153' on the template, and the other component, AC, is parallel to the spindle axis and away from the shoulder 153" on the template.

If the pivot axis for the tracer unit is not inclined to the spindle axis, any adjustment of the tracer unit about the pivot axis effects an adjustment of the stylus only transversely to the surface 153' of the template and there is no adjustment longitudinally of the surface 153' and consequently, no adjustment with respect to the shoulder 153". The result is that when a shoulder has been cut on the workpiece, the tool, on a succeeding cut, merely lightly glides over the face on the workpiece under control of the shoulder 153" on the template and mars the face on the workpiece. When the pivot axis for the tracer unit is inclined to the spindle axis, any adjustment of the tracer unit about the pivot axis, also adjusts the stylus with respect to the shoulder 153" on the template, and the tool, on a succeeding stroke, takes a cut on the face of the workpiece to produce an unmarred finish.

The machine, as illustrated, is set up to turn a workpiece W like that shown in Fig. 4 wherein, on successive rough, semi-finish and finish cuts, the layers of material indicated that R, S and F, respectively, are removed. By substituting the proper template and by adjusting the dogs 82, 83, 84 and 86 to the proper positions, a workpiece W' like that shown in Fig. 4a may be turned, wherein, on successive, rough, semi-finish and finish cuts, the layers of material indicated at R', S', and F', respectively, are removed. While only two examples are illustrated, the lathe is in no way limited to the production of only these two workpieces.

In order to adjust the position of the valve unit, including the stylus, with respect to the tool between successive cuts in a cycle, a cam 142, bolted as at 144 to the pivoted bracket 134, is arranged to bear against surfaces of varied radii on a control disc 171. The disc 171 may be indexed between successive cuts to present succeeding surfaces of diminishing radii to the cam 142, permitting the tracer valve unit 146 and the stylus 153 to fall away from the template 153 under the urge of spring 140. The control disc 171 is mounted on a shaft 170 carried by the bracket 133 and is provided with threaded, radially extending bores 171' spaced at equal intervals circumferentially of the disc. Threaded pins 172 may be adjustably screwed into the bores 171' for engagement with the cam 142.

If a three-cut cycling is desired, as illustrated herein, the first cut is controlled by a pin 172 adjusted to the radius desired. The second cut will be controlled by a succeeding pin 172 adjusted to a shorter radius so that when the disc 171 is indexed one step, the tracer unit is allowed to fall away from the template, thus permitting the tool to move nearer the spindle axis and more to the left on the second cut. No pin 172 is provided in the succeeding bore 171', so that the final cut is not controlled by a pin 172; but instead, the pivoted bracket 134, which carries the tracer unit is permitted to fall against a stop pin 133' (Fig. 5) on the bracket 133. A plurality of similar groupings of pins 172 may be provided on the periphery of the disc 171 to control a plurality of multiple-cut cycles. The omission of the final pin in each group insures uniformity in the finish diameters of successive workpieces produced, since the final cut in all cycles is controlled by the same pin 133' rather than by a plurality of the pins 172, difficult of uniform adjustment. The micrometer adjustments 132 and 132' provide a means for accurately determining the final cut. Instead of omitting the final pin 172 in each grouping, the pin may be screwed up to the limit where it exercises no control over the tracer unit; or, if uniformity in the workpieces is not necessary, the final pin may be utilized to control the tracer unit.

Figure 8:
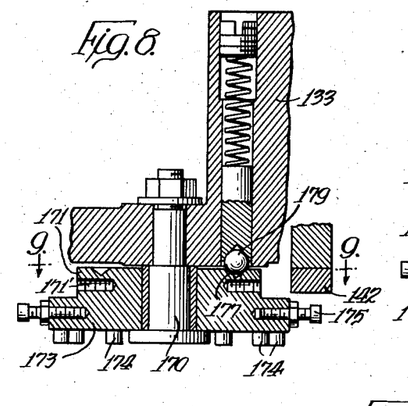
Fig. 8 is a section taken on the line 8—8 of Fig. 6.
Figure 9:
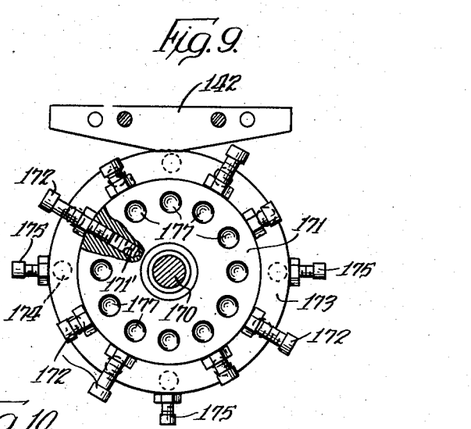
Fig. 9 is a section taken on the line 9—9 of Fig. 8.

In order to index the disc 171, there is also mounted on the shaft 170 a ratchet index plate 173. This plate is fixed with respect to the disc 171. As shown in Fig. 8, the disc 171 and plate 173 are an integral structure. As illustrated in the diagrammatic showing of Fig. 3, these members are axially spaced on the shaft 170 and are connected by a hollow sleeve 170'. The index plate is provided with axially projecting pins 174 which are spaced at intervals corresponding to the spacing of the bores 171' in the disc 171. The pins 174 are employed as the teeth on a ratchet wheel and are arranged to be driven by a pawl. Where the disc 171 and plate 173 are an integral structure, as in Fig. 8, the pins 174 project downwardly. Where the disc 171 and plate 173 are axially spaced, as in Fig. 5, pins 174 may project upwardly. As shown in Fig. 8, the disc will be accurately detented by means of a spring pressed ball 179 which is received in depressions 177 in the disc.

Figures 4A, 10, 11:
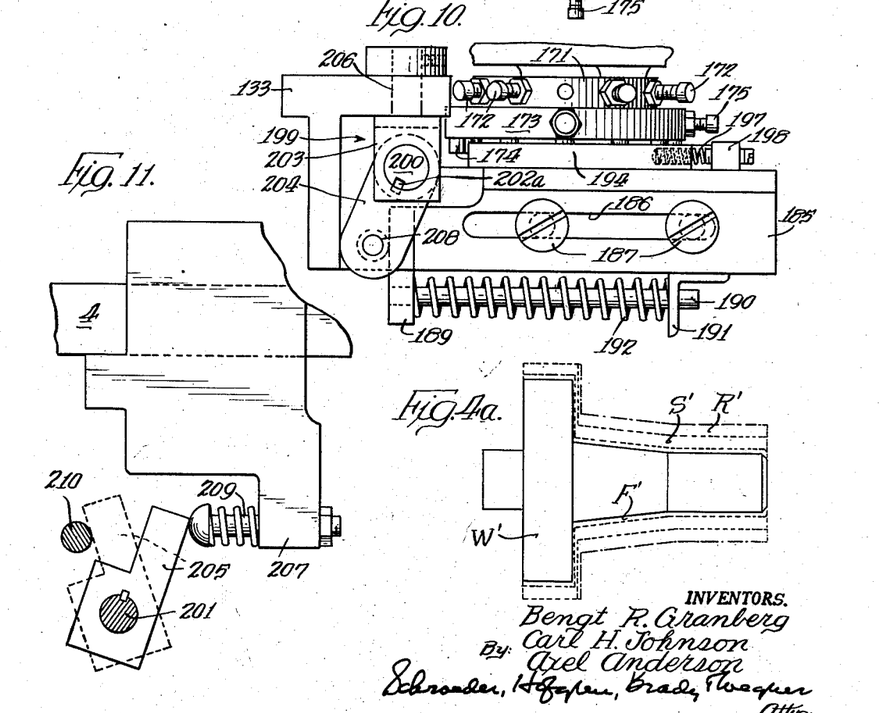
Fig. 4a is a diagrammatic view showing another typical workpiece and layers of material removed.
Fig. 10 is an enlarged front view of the indexing mechanism.
Fig. 11 is a section taken on the line 11—11 of Fig. 6.
Figure 10A:
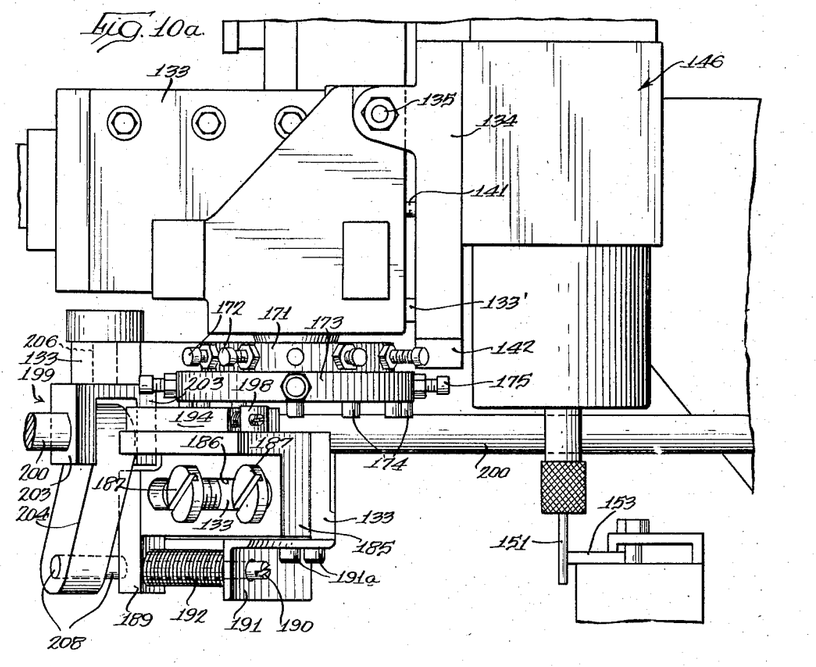
Fig. 10a is an enlarged fragmentary end elevational view taken from the right end of the lathe, as in the case of Fig. 5, illustrating the indexing mechanism.
Figure 10B:
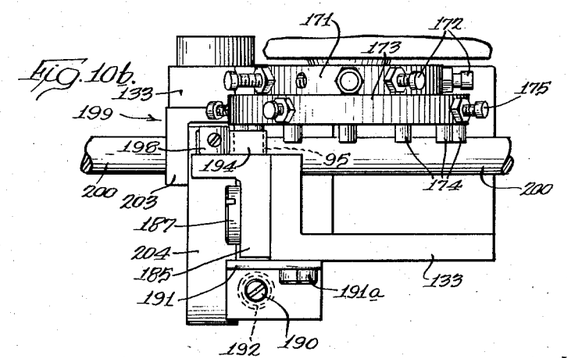
Fig. 10b is a fragmentary end elevational view taken from the right end of Fig. 10.

Referring to Figs. 3, 6 and 10, a pawl carrying bar 185 is provided with a longitudinally-extending slot 186 which embraces guide posts 187 projecting horizontally from the bracket 133. As best shown in Fig. 10, bar 185 is provided with a downwardly-extending projection 189 to which a rod 190 is fixed. The rod 190 extends through an opening in a downwardly extending flange 191 of an angle iron secured on the bracket 133 as by screws 191a Fig. 10a. A spring 192 surrounds the rod and bears between the projection 189 and the flange 191 to maintain the bar in a forward position. The pawl 194 is pivotally mounted at 195 on the bar 185 and is biased toward the projections 174 by a spring 197 anchored at 198 on the bar. Reciprocation of the bar 185 will step the plate 173 and disc 171 a distance of one space.

In order to actuate the pawl-carrying bar 185, at the end of a return stroke of the carriage, a shaft 200 is journalled in a bearing 199 in the bracket 133 and has a universal connection with a shaft 201 journalled on the carriage in a bearing 201a (Fig. 6). The bearing 199 comprises a yoke-shaped member having spaced downwardly extending arms 203, one of which is seen in Fig. 10, and the shaft 200 is journalled in these arms to rock about a horizontal axis. The yoke-shaped member includes an upwardly projecting pin 206 which is retained in the bracket 133 for pivotal movement about its vertical axis. A lever 204 is positioned between yoke arms 203 slidably keyed on the shaft 200 as shown at 202a and is provided with a laterally projecting pin 208 adapted to engage the bar 185 or the element providing downward projection 189, the latter being fixed with reference to bar 185. The bar and the projection are urged toward the pin 208 by the spring 192. A lever 205 is secured to the end of shaft 201 in a position in which it is adapted to strike a stop 207 adjustably secured by screws 207' to the bed of the lathe. In this manner, at the end of a return stroke of the carriage, the lever 205 will strike the stop 207 on the bed and rock the shaft 200—201 to actuate the bar 185 through lever 204 and pin 208. As shown in Fig. 11, the striking of the lever 205 against the stop 207 may be cushioned by providing a spring-biased bolt 209 slidably fitted in the stop. Movement of the arm 205 is limited by a stop 210 on the carriage. It will be appreciated that slidable mounting of the shaft 200 in the bearing 199 permits a transverse movement of the tool slide toward and away from the work axis while maintaining a connection between the lever 204 and the pawl-carrying bar 185.

As illustrated, the carriage is automatically controlled to move through a cycle of three cutting strokes of successively greater length to successively remove the layers of material indicated at R, S, and F in Fig. 4. In connection with this automatic cycling, plate 173 is also provided with radially projecting pins 175 which are arranged to engage an arm 180 to actuate a normally open limit switch 7LS on the slide at the beginning and end of a cycle. The pins 175 are circumferentially spaced on the plate 173 at intervals corresponding to multiples of the spacing of axially projecting pins 174. To provide a three-cut cycle a pin 175 is provided for every third pin 174. As will be explained more fully hereinafter in connection with a description of the wiring diagram, a pin 175 must engage the switch arm 180 and close switch 7LS at the beginning of a cycle in order to permit the machine to be started by a manually operable switch. At the end of a cycle, the pin will again engage the arm 180. While the machine as disclosed provides a three-cut cycle, it is obvious that other multiple cut cycles may be provided. For example, if a four-cut cycle is desired, the pins 172 are arranged successively in groups of four and the pins 175 are arranged at every fourth pin 172.

*Electric circuit components*

Figure 12:
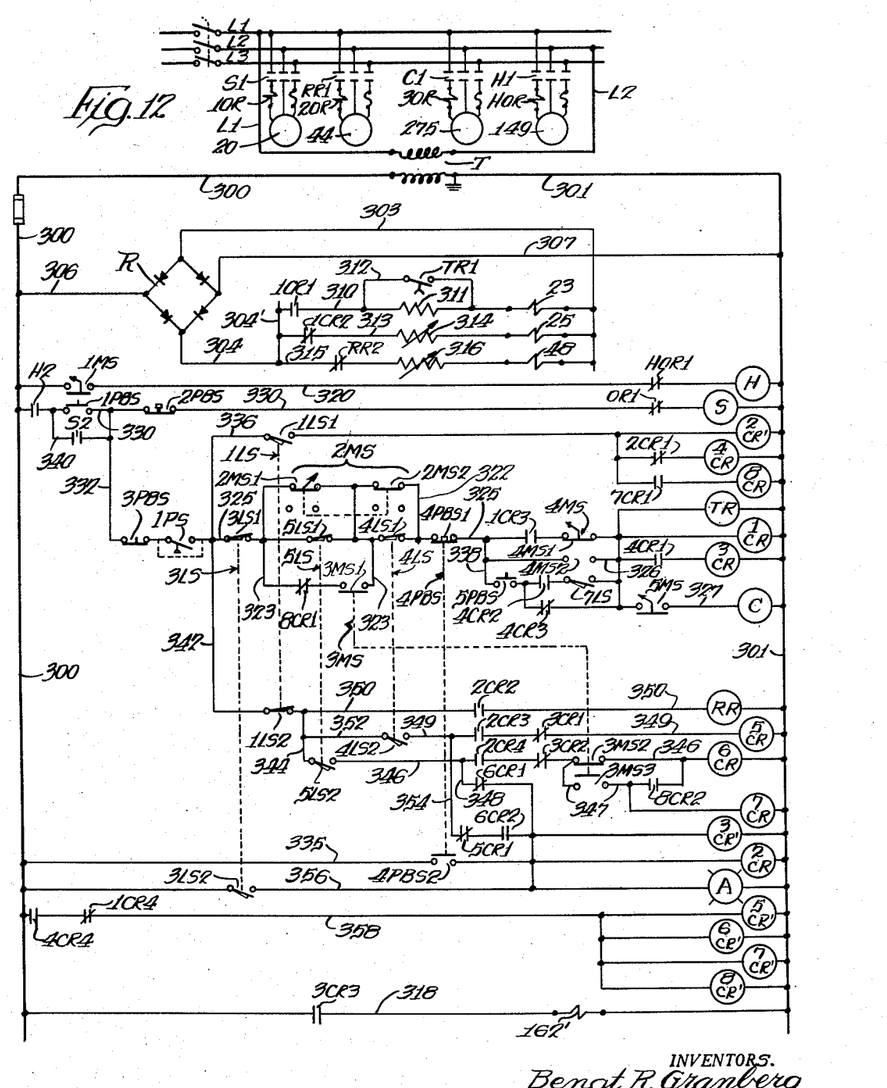
Fig. 12 is a wiring diagram showing the power and control circuits.

Referring now to Fig. 12, the spindle motor 20, the high speed rapid return motor 44, the motor 149 which drives the hydraulic pump for supplying fluid under pressure to actuate the tool slide, and a motor 275 which drives a hydraulic pump for supplying coolant to the tool at the point of cutting are all connected to a three-phase source of supply indicated by the lines $L_1$, $L_2$, and $L_3$ through overload relay coils 1OR, 2OR, HOR, and 3OR, respectively, and through normally open contacts S1, RR1, H1 and C1, respectively. The contacts S1, RR1, H1 and C1 are controlled by relay coils S, RR, H and C, respectively, in the control circuit as will be described presently. The overload relay coils 1OR, 2OR and 3OR, respectively, control normally closed contacts indicated as OR1 in the wire 330 in circuit to the relay coil S, so that in response to an overload current in either of the motors 20, 44, and 275, the circuit to the relay coil S will be broken for a purpose that will appear. The relay coils HOR controls normally closed contacts HOR1 in the wire 320 in circuit to the relay coil H for a similar purpose.

Lines L1 and L2 are connected to the primary of a transformer T and lines 300 and 301 are connected to the secondary of the transformer T. The spindle clutch 23, the spindle brake 25, and the rapid return brake 48 are connected in parallel in a D.C. circuit including a wire 303 and a wire 304 connected to opposite sides of a rectifier R which is supplied by wires 306 and 307 connected across the lines 300 and 301. A wire 310 is connected to a wire 304' extending from the wire 304, and to the spindle clutch 23 through normally open contacts 1CR1 and a resistance 311. A wire 312 is connected in parallel around the resistance 311 and includes normally open contacts TR1. With this arrangement when the contacts 1CR1 are closed by a relay coil 1CR, a circuit is completed through the resistance 311 to the clutch 23 and provides a low starting current. The contacts TR1 are controlled by a timer relay coil TR, explained hereinafter, to close after a momentary delay to provide the full current to the clutch 23. A wire 313 is connected to the wire 304' and to the spindle brake 25 through normally closed contacts 1CR2 and through a rheostat 314. A wire 315 is connected to the wire 304 and to the rapid traverse brake 48 through normally closed contacts RR2 and through a rheostat 316.

The tracer valve control solenoid 162 includes a winding 162' which is connected across the lines 300 and 301 by a wire 318 through normally open contacts 3CR3 which are controlled by relay 3CR as explained hereinafter.

The control circuit includes relay coils H, S, C, RR, timer relay coil TR, and control relay coils 4CR and 1CR, each of which are associated with conventional relays in which the contacts controlled thereby are biased in one direction to a normal position when the relay coil is deenergized and are moved to an opposite position when the coil is energized. The control circuit also includes relays of a conventional type in which the contacts are not biased to a normal position but are moved to both positions by separate coils. For example, the release coil 2CR' and the latch coil 2CR are associated with the same relay. In this relay, the release coil 2CR', when energized, moves the contacts associated therewith to a normal position and when the latch coil 2CR is energized, the position of the contacts is reversed. When the latch coil 2CR is deenergized, the switch contacts controlled thereby do not return to the normal position until the release coil is energized. Similarly, when the release coil 2CR' is deenergized, the switch contacts remain in the normal position until the latch coil 2CR is energized. The circuit also includes latch coils 3CR, 5CR, 6CR, 7CR, and 8CR and release coils 3CR', 5CR', 6CR', 7CR' and 8CR', associated respectively with similar relays.

Figures 13, 14:
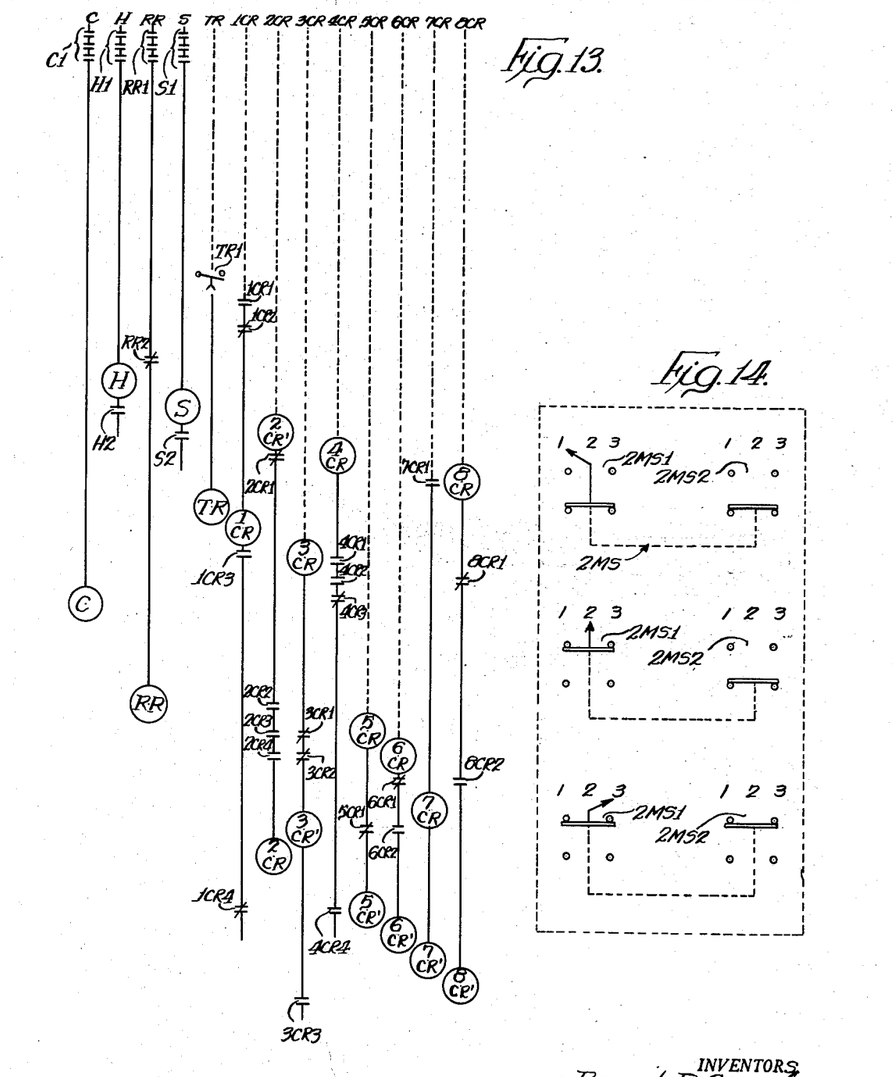
Fig. 13 is a schematic illustration showing the normal positions of switch contacts controlled by the various control relays.
Fig. 14 is a diagram showing the positions of contacts controlled by the manually settable switch 2MS in each of its three positions.

Referring now to Fig. 13, it will be seen that the relay coil C controls only normally open contacts C1. The relay coil H controls normally open contacts H1, and normally open contacts H2. Relay coil RR controls normally open contacts RR1 and normally closed contacts RR2. Relay coil S controls normally open contacts S1 and normally open contacts S2. The timer relay coil TR controls normally open contacts TR1. The coil 1CR controls normally open contacts 1CR1, normally closed contacts 1CR2, normally open contacts 1CR3, and normally closed contacts 1CR4. The coils 2CR control normally closed contacts 2CR1 and normally open contacts 2CR2, 2CR3, and 2CR4. The coils 3CR control normally closed contacts 3CR1 and 3CR2 and normally open contacts 3CR3. The coil 4CR controls normally open contacts 4CR1 and 4CR2, normally closed contacts 4CR3 and normally open contacts 4CR4. The coils 5CR control normally closed contacts 5CR1. The coils 6CR control normally closed contacts 6CR1 and normally open contacts 6CR2. The coils 7CR control normally open contacts 7CR1. The coils 8CR control normally closed contacts 8CR1 and normally open contacts 8CR2.

Referring now to Fig. 12, the control circuit includes manually settable switches 1MS, 2MS, 3MS, 4MS, and 5MS. The switch 1MS is provided in the wire 320 connected between the lines 300 and 301 and including normally closed contacts HOR1 and the relay H. The switch 1MS may be closed to energize the relay H.

The switch 2MS, of conventional construction, is connected in a wire 322 and includes contacts 2MS1 and 2MS2 and as shown in detail in Fig. 14, may be set to any one of three positions. This switch is a cycle control switch which may be set to any one of its three positions to provide either of a one-cut, two-cut, or three-cut cycling. As shown in Fig. 14, when the switch is set to the position 1, neither of the contacts 2MS1 or 2MS2 is closed. In position 2, the contacts 2MS1 are closed while the contacts 2MS2 are open. In position 3, the contacts 2MS1 and the contacts 2MS2 are closed.

The functions of the switch in the various positions described are explained hereinafter in describing the operation.

The switch 3MS may be set to provide a repeat movement of the carriage through the first cutting stroke. As seen in Fig. 12, the switch 3MS includes normally open contacts 3MS1 connected in a wire 323, normally closed contacts 3MS2 in wire 346, and normally open contacts 3MS3 in wire 347. As shown, the switch is set to provide only a single first cut. To repeat the first cutting stroke, the switch is set to close contacts 3MS1, to open contacts 3MS2, and to close contacts 3MS3, as explained in detail hereinafter in describing the operation of the lathe. While the carriage is thereby caused to repeat the movement of the first cutting stroke, it will be appreciated that the tool slide is moved further in toward the workpiece to remove a second layer of material.

The switch 4MS is connected in a wire 325 and includes contacts 4MS1 in wire 325 which may be closed as shown for operating the spindle at "run" and contacts 4MS2 in wire 326 which may be closed to operate the spindle at "jog," as explained more in detail hereinafter.

The switch 5MS is connected in a wire 327 and may be closed to complete the circuit to the relay C which controls the coolant motor 275.

The control circuit includes push button switches 1PBS, 2PBS, 3PBS, 4PBS, and 5PBS. The "run" switch 1PBS is connected in a wire 330 and may be closed to energize the relay S to start the spindle motor 20. The "stop" switch 2PBS is also connected in the wire 330 and may be opened at any time to stop the spindle motor 20. The "cycle stop" switch 3PBS is connected in a wire 332 and may be opened at any time to open all circuits controlling the automatic movement of the tool. The "return" switch 4PBS includes normally closed contacts 4PBS1 in the wire 325 and normally open contacts 4PBS2 in the wire 335 and may be operated to return the carriage. The "cycle start" switch 5PBS is connected in the wire 338 and is closed to initiate an automatic multiple cut cycling.

A pressure switch 1PS is connected in the wire 332 and is closed when the workpiece is mounted in the chuck on the work supporting spindle.

The control circuit includes the limit switches 1LS, 3LS, 4LS, 5LS, and 7LS which are operated as previously described by moving parts to effect an automatic control of the lathe. The limit switch 1LS which is operated when the carriage is at the limit of its return movement includes normally open contacts 1LS1 in a wire 336 and normally closed contacts 1LS2 in a wire 342. Limit switch 5LS which is operated at the end of the first cut includes normally closed contacts 5LS1 in the wire 325 and normally open contacts 5LS2 in the wire 346. Limit switch 4LS which is operated at the end of the second cut includes normally closed contacts 4LS1 in the wire 325 and normally open contacts 4LS2 in the wire 349. Limit switch 3LS which is operated at the end of the third cut includes normally closed contacts 3LS1 in the wire 325 and normally open contacts 3LS2 in wire 356. The limit switch 7LS in the wire 338 is normally open and is closed by a pin 175 on the index plate 173 at the beginning and the end of a multiple-cut operation. This switch must be closed in order to initiate a multiple-cut cycling.

*Operation*

The operation of the circuit will be described in connection with an automatic three-cut cycle. The switch 2MS is set to position 3 in which both the contacts 2MS1 and 2MS2 are closed. The switch 3MS is set in a position in which the first cut will not be repeated. In this position, the contacts 3MS1 are open, the contacts 3MS2 are closed, and the contacts 3MS3 are open. If it is desired that the spindle be automatically operated to run during the automatic cycle, as is usually the case, the manually settable switch 4MS in wire 325 is set to the "run" position, that is, with the contacts 4MS2 in wire 325 closed. The "hydraulic" switch 1MS may now be closed to complete a circuit from the line 300 through the switch 1MS, the wire 320, normally closed contacts HOR1, the coil H and line 301. Energization of the coil H closes the normally open switch contacts H1 to start the hydraulic motor 149 and closes the normally open contacts H2 in the wire 330. The "run" switch 1PBS may now be closed to complete a circuit from the line 300 through the now closed contacts H2, the switch 1PBS, the switch 2PBS, the wire 330, the normally closed contacts OR1, the coil S, and the wire 301. Energization of the coil S closes the normally open contacts S1 to start the spindle motor 20 and closes the normally open contacts S2 in the wire 340 which by-passes the switch 1PBS, to complete a holding circuit to the coil S.

Because the workpiece has previously been placed in the chuck, the switch 1PS is closed and because of the carriage is at its starting point, the contacts 1LS1 are closed to complete a circuit to the release coil 2CR' and to the coil 4CR through normally closed contacts 2CR1. Energization of the coil 4CR effects closure of its contacts 4CR2 in wire 326 and its contacts 4CR2 in wire 338.

The "cycle start" switch 5BS is now closed to complete a circuit from the wire 332 through the wire 325, the limit switches 3LS, 5LS, and 4LS, the switch 4PBS, the wire 338, the switch 5PBS, the now closed contacts 4CR2 and the limit switch 7LS to the timer relay coil TR, the coil 1CR and the latch coil 3CR through now closed contacts 4CR1. Energization of the coil 1CR closes the normally opened contacts 1CR3 in the wire 325 to complete a holding circuit through the closed contacts 4MS1 for the timer relay TR, the coils 1CR, and 3CR and the relay C. Energization of the coil 1CR also closes contacts 1CR1 in the wire 310 to energize the spindle clutch 23 and opens contacts 1CR2 in wire 313 to deenergize the spindle brake 25. Energization of the timer relay TR closes its contacts TR1 in wire 312 after a momentary delay to supply full current to the spindle clutch 23. Energization of the latch coil 3CR closes its normally open contacts 3CR3 in the wire 318 to complete a circuit to the tracer control solenoid 162 and the slide moves in toward the work. Relay coil TR and coil 1CR remain energized until the end of a multiple-cut operation.

When the spindle clutch 23 is energized as described above, the carriage movement begins in a cutting direction. As the carriage movement starts the control dog disc allows the switch contacts 1LS1 to open and thus de-energize the coil 4CR. When the coil 4CR is de-energized, its contacts 4CR1, in circuit with the coil 3CR, are opened and the coil 3CR is de-energized, but the contacts 3CR3 controlled by the coil 3CR remain closed until the coil 3CR' is energized. As the control dog disc continues to rotate in step with the carriage movement, it actuates the limit switch 5LS to open its contacts 5LS1 and to close the contacts 5LS2. The opening of the switch 5LS does not affect the circuit to the timer relay TR and the coil 1CR since a bypass circuit is completed through the switch 2MS. When the contacts 5LS2 are closed, a circuit is completed through the wire 342, contacts 1LS2, wire 344, contacts 5LS2, wire 346, wire 348, and normally closed contacts 6CR1 to release coil 3CR', latch coil 2CR, and a lamp A on the control panel. Energization of the release coil 3CR' opens the contacts 3CR3 to de-energize the tracer control solenoid and allow the slide to move out. Energization of the latch coil 2CR closes its normally open contacts 2CR2 in the wire 350 to complete a circuit to the relay coil RR to close contacts RR1 and energize rapid traverse motor 44 for carriage return. Energization of the release coil 3CR' also closes its contacts 3CR2 in the wire 346 and energization of the latch coil 2CR closes its contacts 2CR4 in the wire 346 so that a circuit is completed through the contacts 3MS2 to the latch coil 6CR. Energization of the latch coil 6CR opens its normally closed contacts 6CR1 in wire 348 so that when the switch 5LS is actuated on the second cut, no circuit can be completed to the release coil 3CR' and the latch coil 2CR. Energization of the latch coil 6CR also closes its contacts 6CR2 in the wire 354 so that when the limit switch 4LS is actuated by the dog disc on the second cut, the release coil 3CR' and the latch coil 2CR may be energized.

When the carriage reaches the limit of its return movement, the dog disc will again close the contacts 1LS1 so that the release coil 2CR' and the coil 4CR are again energized. Energization of the coil 4CR will again close its contacts 4CR1 to energize the latch coil 3CR to move the tool slide in.

At this point, it would be well to describe the operation and effect of manually settable switch 3MS which may be closed to cause a repeat movement of the carriage through a cutting stroke of the same length as the first cut. When the switch 3MS is set to provide this repeat movement, its contacts 3MS1 will be closed, its contacts 3MS2 will be opened and its contacts 3MS3 will be closed. With these conditions, when the limit switch 5LS is operated by the dog disc to terminate the first cutting stroke, contacts 5LS2 will be closed to complete a circuit to the release coil 3CR', the latch coil 2CR and the lamp A through normally closed contacts 6CR1 as previously described. Energization of the release coil 3CR' closes its contacts 3CR2 in the wire 346 and energization of the latch coil 2CR closes its contacts 2CR4 in the wire 346 as previously described so that a circuit is completed through contacts 3MS3 to energize the latch coil 7CR instead of through contacts 3MS2 to energize latch coil 6CR. Energization of the latch coil 7CR closes its normally open contacts 7CR1 in circuit with the latch coil 8CR so that when the limit switch 1LS is closed at the limit of the carriage return movement, latch coil 8CR will be energized. Energization of the latch relay 8CR opens its normally closed contacts 8CR1 in the wire 323 so that the contacts 3MS1 are no longer effective. Energization of the latch coil 8CR also closes its normally open contacts 8CR2 in the wire 347 to condition the circuit for energization of the latch coil 6CR only when the limit switch 5LS is actuated on the repeat movement. After this cut, the circuit operates as explained hereinafter.

As the carriage progresses through the second cutting movement, the operation of the limit switch 5LS by the dog disc will have no effect since the contacts 6CR1 are now open. When the dog disc actuates the limit switch 4LS, its contacts 4LS1 are opened and the contacts 4LS2 are closed completing a circuit through the closed contacts 1LS2, the wire 344, the wire 352, closed contacts 4LS2, wire 354, normally closed contacts 5CR1 and now closed contacts 6CR2 to release coil 3CR' and latch coil 2CR. This will again initiate a withdrawal of the tool slide and a return movement of the carriage. Energization of the release coil 3CR' closes its contacts 3CR1 in wire 349 and energization of the latch coil 2CR closes its contacts 2CR3 in wire 349 so that a circuit is completed to the latch coil 5CR. Energization of the latch coil 5CR opens its normally closed contacts 5CR1 in the wire 354 so that when the limit switch 4LS is actuated by the dog disc on the third cut, the release coil 3CR1 and the latch coil 2CR will not be energized.

On the third cut, operation of the limit switches, 4LS and 5LS will be ineffective as explained and when the dog disc actuates the limit switch 3LS, its contacts 3LS1 are opened and the contacts 3LS2 are closed to complete a circuit through the wire 356 to the release coil 3CR' and the latch coil 2CR. When the switch 3LS is opened, the holding circuit to the timer relay coil TR and the coil 1CR is broken so that the spindle clutch is de-energized and the normally closed contacts 1CR4 in the wire 358 are closed. When the limit switch 1LS is closed at the end of the carriage return movement, the release coil 2CR' will again be energized, its contacts 2CR1 closed, the coil 4CR energized and its contacts 4CR4 in the line 358 will be closed. This completes a circuit to the release coils 5CR', 6CR', 7CR', and 8CR' to recondition the circuit for a second multiple-cut operation.

If, instead of a three-cut operation, a single-cut operation is desired, the switch 2MS will be set to position 1 as shown in Fig. 14 in which both the contacts 2MS1 and 2MS2 are open. With this condition, it is apparent that when the limit switch 5LS is operated at the end of the carriage movement for the first cut, the holding circuit to timer relay coil TR and the coil 1CR is broken and no by-pass circuit is provided unless the contacts 3MS1 are closed to repeat the first cut. The indexing mechanism for the tracer unit 146 may be disabled by adjusting the stop 207 on the bed so that the arm 205 does not reach the stop on the return stroke of the carriage.

If a two-cut operation is desired, the switch 2MS will be set to position 2 as shown in Fig. 14 in which the contacts 2MS1 are closed and the contacts 2MS2 are opened. With this condition, it will be apparent that the limit switch 5LS is bypassed by the contacts 2MS1 so that when this switch is operated, the holding circuit to the timer relay coil TR and the coil 1CR is not broken. At the end of the second cut, when the limit switch 4LS is opened, there is no bypass circuit since the contacts 2MS2 are open and the holding circuit to the timer relay TR and the coil 1CR is broken.

As described previously, the manually settable switch 4MS in wire 325 is utilized for controlling operation of the spindle at "run" or at "jog." When automatic operation of the spindle at "run" during automatic cycling of the lathe is desired, the switch 4MS is set to close the contacts 4MS1 and to open the contacts 4MS2. With the switch positioned in this manner, closure of "cycle start" switch 5PB5 is effective to initiate and maintain spindle operation by energizing the relay coil 1CR and establishing a holding circuit for the coil 1CR through contacts 4MS1, as described hereinabove. When it is desired to "jog" the spindle or to control spindle operation manually, the switch 4MS is set to open the contacts 4MS1 and may be utilized to close the contacts 4MS2 to effect spindle operation for such periods of time as desired, after which the contacts 4MS2 are opened.

We claim:

1. A multiple cut tracer lathe, comprising, in combination, a bed, a template secured on the bed, a carriage reciprocable on the bed longitudinally relative to the template, a tool slide movable on the carriage transversely of the direction of carriage movement, a motor for moving said slide on said carriage, a tracer support on said slide, a tracer control unit adjustable on said tracer support transversely of the direction of carriage movement and having a stylus engageable with said template and controlling said motor, an indexable rotor on said tracer support having means for adjusting the position of said tracer control unit on said tracer support to enable multiple cuts with a single template, a pawl and ratchet device on said tracer support for indexing said rotor, and means for actuating said pawl and ratchet device including, a flexible shaft having one end portion journalled on said carriage and the other end portion journalled on said tracer support, an arm affixed to said one shaft end portion and engageable with said bed at the end of a carriage return stroke to rock said shaft, and a second arm on said other shaft end portion connected to said pawl and ratchet device to actuate the same and thereby index said rotor when the shaft is rocked.

2. A multiple cut tracer lathe, comprising, in combination, a bed, a template secured on the bed and having a longitudinal axis extending longitudinally of the bed, a carriage reciprocable longitudinally on the bed, a tool slide movable on the carriage transversely of the direction of carriage movement, a motor for moving said slide on said carriage, a tracer support on said slide, a tracer control unit adjustable on said tracer support transversely of the direction of carriage movement and having a movable stylus engageable with said template and controlling said motor, an indexable rotor on said tracer support having means for adjusting the position of said tracer control unit on said tracer support to enable multiple cuts on a single workpiece with a single template, a pawl and ratchet device on said tracer support for indexing said rotor, and means for actuating said pawl and ratchet device including, a shaft comprising two shaft portions, a universal connection joining the two shaft portions, means journalling one shaft portion on said carriage, a pivoted journal on said tracer support rotatably and slidably supporting said other shaft portion, an arm on said first shaft portion engageable with said bed at the end of a carriage return stroke for rocking said shaft, and a second arm on said other shaft portion engageable with said pawl and ratchet device to actuate the same and thereby index said rotor when the shaft is rocked.

3. In a tracer lathe having a stationarily mounted tracer control template, a tool slide mounted for movement longitudinally and transversely relative to the template, and a motor for moving said tool slide transversely, in combination therewith, a tracer housing mounted on said slide for adjustment transversely relative to said template, a control member movable in said housing for controlling said motor, a stylus movably mounted in said housing, engageable with said template and connected with said control member to control transverse movement of said slide according to the pattern of said template, and means for adjusting said housing on said slide to enable multiple cuts with a single template comprising means biasing said housing in a direction away from said template, and stop means for determining the position of said housing on said slide comprising a plurality of at least three separate stops on said slide of successively diminishing lengths successively engageable with said housing to limit movement of the housing in opposition to said biasing means, means mounting at least two of the stops for movement toward and away from an operative position wherein the stop is engageable by said housing, and means for successively moving said movable stop into and out of the operative position.

4. In a tracer lathe having a stationarily mounted tracer control template, a tool slide mounted for movement longitudinally and transversely relative to the template, and a motor for moving said tool slide transversely, in combination therewith, a tracer housing mounted on said slide for adjustment transversely relative to said template, a control member movable in said housing for controlling said motor, a stylus movably mounted in said housing, engageable with said template and connected with said control member to control transverse movement of said slide according to the pattern of said template, and means for adjusting said housing on said slide to enable multiple cuts with a single template comprising means biasing said housing in a direction away from said template, and stop means for determining the position of said housing on said slide comprising a unidirectionally indexable disc on said slide, a plurality of similar groups of tracer unit stops on said disc, said groups being equally spaced angularly on said disc and each group including a plurality of radially projecting stops of successively diminishing lengths equally spaced angularly on said rotor and successively engageable with said unit one at a time to determine the position thereof, and means for indexing said rotor to successively position the stops of one group for engagement with said unit and then to successively position the stops of the succeeding group for engagement with the unit.

5. In a tracer lathe having a tracer control template, and a tool slide mounted for movement longitudinally and transversely relative to the template, in combination therewith, a tracer unit support on said slide, a tracer control unit mounted on said support for adjustment transversely relative to said template and having a stylus engageable with said template to control transverse movement of said slide according to the pattern of said template, and means for adjusting said tracer control unit on said support to enable multiple cuts on a single workpiece with a single template comprising means biasing said unit in a direction away from said template, stop means for determining the position of said unit on said support comprising an indexable rotor on said support having a plurality of similar groups of tracer unit stops, each group including a plurality of adjustable stop projections of successively diminishing lengths equally spaced angularly on said rotor and successively engageable with said unit one at a time to determine the position of the unit, said groups of stop projections being equally spaced angularly on said rotor with spaces between groups corresponding to twice the spacing between projections within a group, means for indexing said rotor successively through steps each corresponding to the spacing between adjacent projections in one group, and a fixed stop on said tracer support engageable by said tracer unit to determine the position thereof when no stop projections are positioned for engagement with the unit.

6. In a multiple cut tracer lathe for turning and facing a rotating workpiece, the combination comprising, a stationarily mounted template having a laterally facing control pattern, a carriage reciprocable longitudinally relative to the template, a tool slide reciprocable on the carriage obliquely relative to the direction of carriage movement, a motor for moving said tool slide on said carriage, a tracer unit support on said slide, a tracer housing on said support, a control member movable in said housing for controlling said motor, a stylus movably mounted in said housing, depending therefrom, having an axial surface engageable with said pattern, and connected with said control member to control transverse movement of said slide according to the pattern of said template, means mounting said tracer housing for pivotal adjustment on said support about an axis extending generally longitudinally of but inclined relative to the direction of carriage movement to permit adjustment of said stylus relative to said template and relative to a tool carried by said slide, and means for adjusting the pivotal position of said housing to simultaneously adjust said stylus both longitudinally and transversely relative to the direction of carriage movement comprising means biasing said housing in a direction away from said template, and stop means for determining the position of said housing comprising an indexable rotor having a series of projections of successively diminishing lengths angularly spaced on the rotor and engageable one at a time with said housing to limit movement of the housing in opposition to said biasing means, and means for indexing said rotor to successively position shorter projections for engagement with said housing.

7. A multiple cut tracer lathe, comprising, in combination, a bed, a template secured on the bed, a carriage reciprocable on the bed longitudinally relative to the template, a tool slide reciprocable on the carriage obliquely relative to the direction of carriage movement, a motor for moving said tool slide on said carriage, a tracer unit support on said slide, a tracer housing on said support, a control member movable in said housing for controlling said motor, a stylus movably mounted in said housing, depending therefrom, having an axial surface engageable with said pattern, and connected with said control member to control transverse movement of said slide according to the pattern of said template, means mounting said tracer housing for pivotal adjustment on said support about an axis extending generally longitudinally of but inclined relative to the direction of carriage movement to permit adjustment of said stylus relative to said template and relative to a tool carried by said slide, and means for adjusting the pivotal position of said housing to simultaneously adjust said stylus both longitudinally and transversely relative to the direction of carriage movement comprising means biasing said housing in a direction away from said template, and stop means for determining the position of said housing comprising an indexable rotor having a series of projections of successively diminishing lengths angularly spaced on the rotor and engageable one at a time with said housing to limit movement of the housing in opposition to said biasing means, a pawl and ratchet device on said tracer support for indexing said rotor, and means for actuating said pawl and ratchet device including, a shaft comprising two shaft portions, a universal connection joining the two shaft portions, means journalling one shaft portion on said carriage, a pivoted journal on said tracer support rotatably and slidably supporting said other shaft portion, an arm on said first shaft portion engageable with said bed at the end of a carriage return stroke for rocking said shaft, and a second arm on said other shaft portion engageable with said pawl and ratchet device to actuate the same and thereby index said rotor when the shaft is rocked.

8. In a multiple cut tracer lathe for turning and facing a rotating workpiece, the combination comprising, a stationarily mounted template, a carriage reciprocable longitudinally relative to the template, a tool slide reciprocable on the carriage obliquely relative to the direction of carriage movement, a tracer unit support on said slide, a tracer control unit on said support including a tracer control housing, a control member movable in the housing for controlling movement of the tool slide, and a stylus movably mounted in said housing, engageable with said template and connected to operate said control member to control oblique movement of said slide according to the pattern of said template, means on said support providing a tracer unit pivot axis extending generally longitudinally of but inclined slightly relative to the direction of carriage movement, means mounting said tracer unit housing on said support for adjustment pivotally about said pivot axis to enable adjustment of said stylus relative to said template and relative to a tool carried by said slide and in a direction extending generally normal to the path of carriage movement but inclined slightly to the normal, and means on said support for pivotally adjusting said tracer control unit housing about said pivot axis to simultaneously adjust said stylus both transversely and slightly longitudinally relative to the direction of carriage movement thereby to permit a plurality of cuts on axial and radial surfaces under control of said template.

References Cited in the file of this patent

UNITED STATES PATENTS

| | | |
|---|---|---|
| 2,250,241 | Thalmann | July 22, 1941 |
| 2,361,453 | Casella | Oct. 31, 1944 |
| 2,376,405 | Turchan | May 22, 1945 |
| 2,389,653 | Turchan | Nov. 27, 1945 |
| 2,402,450 | Salisbury | June 18, 1946 |
| 2,490,128 | Henkes | Dec. 6, 1949 |
| 2,592,920 | Lovely | Apr. 15, 1952 |
| 2,594,694 | Smith | Apr. 29, 1952 |
| 2,603,117 | Turchan | July 15, 1952 |
| 2,618,244 | Roehm | Nov. 18, 1952 |

(Other references on following page)

UNITED STATES PATENTS

| | | |
|---|---|---|
| 2,641,151 | Lee | June 9, 1953 |
| 2,674,139 | Stern | Apr. 6, 1954 |
| 2,676,507 | Brusque | Apr. 27, 1954 |
| 2,677,285 | Volk | May 4, 1954 |
| 2,678,579 | Siekmann | May 18, 1954 |
| 2,693,125 | Von Zelewsky | Nov. 2, 1954 |
| 2,695,543 | Von Zelewsky | Nov. 30, 1954 |
| 2,777,350 | Doll | Jan. 15, 1957 |

FOREIGN PATENTS

| | | |
|---|---|---|
| 516,823 | Belgium | Jan. 31, 1953 |
| 522,711 | Belgium | Sept. 30, 1953 |
| 685,191 | Great Britain | Dec. 31, 1952 |
| 752,214 | Great Britain | July 4, 1956 |
| 762,368 | Great Britain | Nov. 28, 1956 |
| 1,091,264 | France | Oct. 27, 1954 |